United States Patent [19]

Vezirian

[11] Patent Number: 4,596,472
[45] Date of Patent: Jun. 24, 1986

[54] THRUST BEARING AND AXIAL RETAINER SYSTEM FOR ROTARY CONE ROCK BITS AND METHOD FOR ASSEMBLING SAME

[76] Inventor: Edward Vezirian, 110 Firwood, Irvine, Calif. 92714

[21] Appl. No.: 744,051

[22] Filed: Jun. 6, 1985

[51] Int. Cl.⁴ .............................................. F16C 43/02
[52] U.S. Cl. ................................................ 384/96
[58] Field of Search ........................... 384/96, 95, 94; 175/371, 372; 29/149.5 C

[56] References Cited

U.S. PATENT DOCUMENTS

| | | | |
|---|---|---|---|
| 2,065,740 | 12/1936 | Reed | 384/96 |
| 2,065,741 | 12/1936 | Reed | 384/96 |
| 4,445,791 | 5/1984 | Klima | 384/96 |

*Primary Examiner*—Lenard A. Footland

[57] ABSTRACT

An improved retention and thrust bearing system for accurately retaining and locating a rotary rock cutter cone upon a journal shaft supported by a rock bit body is disclosed.

A rotary rock cutter cone is rotatively supported on a cooperating journal shaft by plain friction bearing means.

A pair of complimentary symmetrical and substantially rectangular annularly arranged grooves are formed in the bearing surfaces of both the rotary cutter and the journal shaft at matching positions intermediate the length of the friction bearing.

A multiplicity of retention and thrust bearing elements each having a thickness predetermined to substantially fill the mated grooves in intimate sliding relationship thereto, are assembled into the mated grooves via a small bore formed longitudinally within the journal shaft, having an entrance in the supported end of the cantilevered journal shaft and an exit intersecting the floor of the annular groove in the journal shaft. Each retention and thrust bearing element is moved laterally through the intersection of bore and groove into engagement with both of the aligned mating grooves, and when the selected number of bearing elements occupy the grooves then the intersection is operably closed to retain the bearing elements within the mating grooves.

24 Claims, 8 Drawing Figures

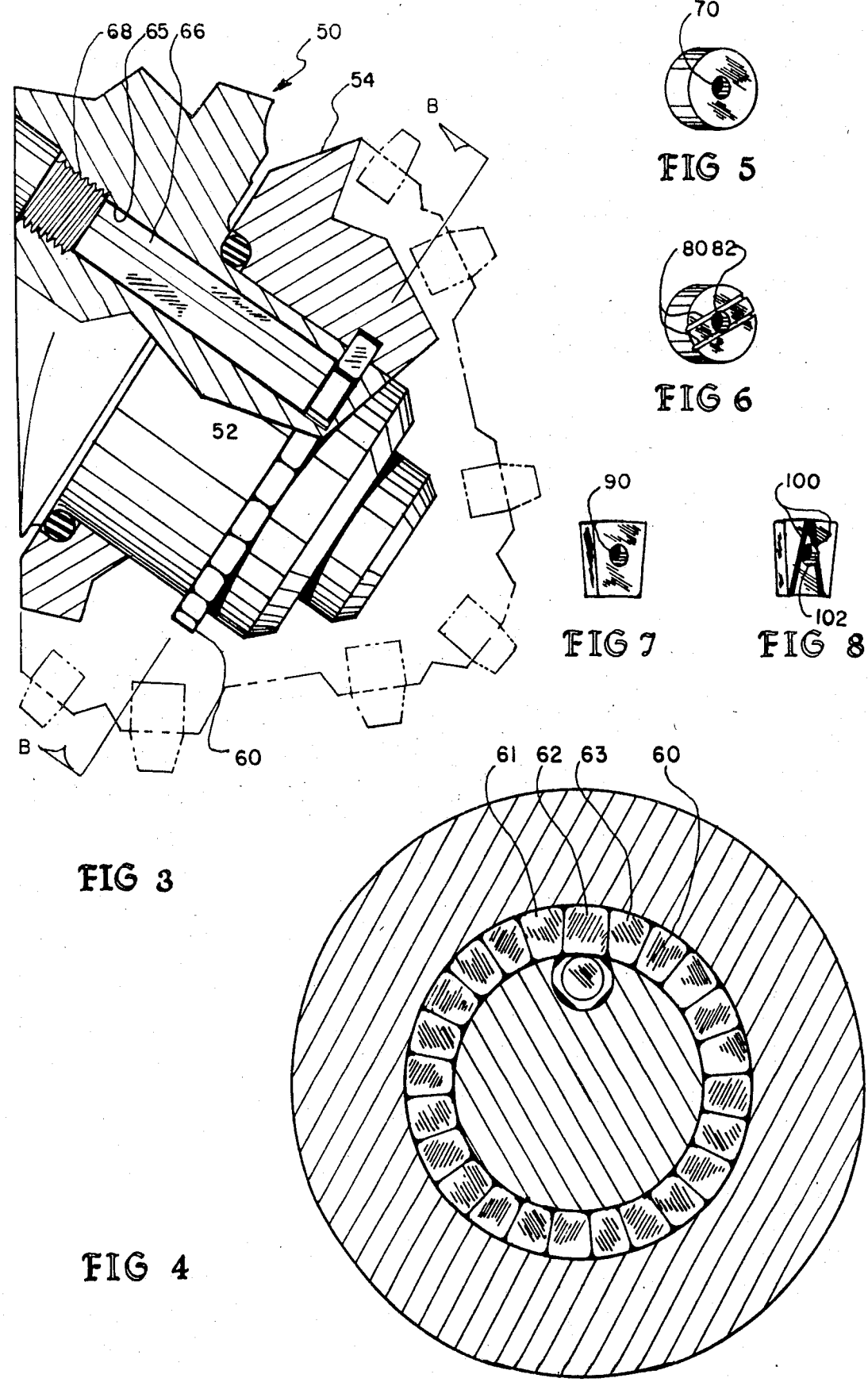

THRUST BEARING AND AXIAL RETAINER SYSTEM FOR ROTARY CONE ROCK BITS AND METHOD FOR ASSEMBLING SAME

BACKGROUND OF THE INVENTION

1. Field of the Invention

The present invention relates generally to an improved rotary rock cutter-to-journal shaft retention and thrust bearing system, and, more specifically, to such a system which not only improves the retention and thrust bearing load carrying capabilities of such a system over the prior art, but which also accurately establishes and maintains a preselected axial position of the cutter upon the supporting journal shaft. Further, this invention substantially increases the potential effective size of the radial bearing footprint, thereby improving axial stability of the cutter about its shaft.

2. Brief Description of the Prior Art

Various retention and thrust bearing systems for rotary rock cutters mounted on a journal shaft are found in the prior art.

One example of such a prior art system is found in U.S. Pat. No. 3,620,580 by Cunningham, which describes and analyzes in some detail the use of steel bearing balls arranged in a pair oppositely-disposed complementary deep ball races. One such ball race is formed in the bore of the cutter, and the other is formed in the surface of the journal shaft. The ball races are relieved so that only those retention and thrust loads which are directed radially inward, relative to the bore hole, are imposed upon the balls, and radial loads are never imposed upon the balls.

When placed under operational conditions, the balls are loaded in shear against the relatively sharp edges of the rims of the ball races. Under the extremely heavy shock loads encountered in well drilling, the sharp edges of the ball races fail by spalling away. Such spalling is not only destructive with respect to the balls and races, but also is productive of metallic debris whereby the entire bearing structure and lubrication system of the cutter-shaft combination is disadvantaged.

Further, it should be clearly understood and appreciated that within a rotary rock bit, space is at an extreme premium. A retention and thrust bearing system based upon balls occupies a relatively large volume of space while providing a very limited bearing capacity, because the loads are concentrated upon small point contact areas of both balls and races.

Another system is described in U.S. Pat. No. 2,076,003 issued to Reed, which teaches the use of a number of disks resembling thick coins which are half housed in a square groove formed within the rotary rock cutter while the remaining halves ride against a radially extended flange formed on the surface of the journal shaft.

While the retention strength of this configuration is relatively high, being equal to the shearing strength of the disks taken across the sum of their diameters, the system is disadvantaged in that it occupies a volume of space comparable to that occupied by the ball system of Cunningham. It is further disadvantaged in that the structural support of the cantilevered journal shaft is seriously weakened at the critically loaded leg-to-journal shaft junction, by the removal of a large radial segment of metal in order to permit assembly.

In U.S. Pat. No. 2,192,697 by Scott, a rotary rock cutter and journal shaft retention and thrust bearing system is disclosed which uses a primary roller radial bearing, and a second friction radial bearing with a radially extending flange formed by the journal shaft disposed in between. The secondary friction bushing is split longitudinally and fits into an annular groove formed in the surface of the journal shaft. This bushing has an annular rectangular groove formed in its outside diameter which compliments a similar groove formed in the rotary rock cutter, the pair being adapted to receive a thick snap ring. The snap ring is compressed to be loaded into the groove in the rotary rock cutter, the groove being oversize. The bushing outside diameter is tapered smaller at its distal end to facilitate entry into the snap ring at assembly.

Although the thrust bearing capacity of this design is adequate, the radial bearing capacity is low considering the inefficient use of space of both the rolers and the thick bushing.

A thrust bearing and retention design is disclosed by Boice in U.S. Pat. No. 2,661,322 which uses a complement of tapered rollers as conventionally used in roller thrust bearings.

Although the bearing capacity of this system is better than the capacity of the Cunningham system, it is substantially less than is provided by such a system as, for example, Reed. In the Boice system, thrust loads in either direction serve to put the larger end of the rollers into hard frictional contact with the outside diameter of the race formed in the rotary rock cutter, and thus against the retaining member used to block the loading hole which is formed through the outer working surface of the rock cutter. This hole through the outer surface of the rock cutter is sealed after assembly by welding. Welding is to be avoided, as a practical matter, in that such a process causes a loss of control of critical internal dimensions through warpage and distortion, and the wear resistance surface generated by heat treat processes is seriously disrupted by the welding process. Such a welded spot disrupts the integrity of the formerly single piece, metallurgically-uniform, rock cutter body and the strength of the rotary rock cutter by the introduction of undesirable stress risers in the rotary rock cutter body.

Another approach is taught in U.S. Pat. No. 2,823,083 by Welton. In this approach, symmetrical complementary 45 degree "V" grooves are formed respectively in rock cutter bore and journal shaft surface. Alternating crossed rollers which are of a length slightly less than their diameter are disposed in the opposing grooves in a configuration commonly known as a "crossed roller bearing". Such bearings are generally used to carry primary radial or linear loads along with minor thrust loads in either direction.

In this particular design, the radial capacity is helpful to compensate in part for the substantial loss of radial bearing length incurred in its use. While retention strength is relatively high in this system, being equal to the shear strength of the sum of the rollers taken diagonally through their bodies, it is disadvantaged by low thrust load capacity. Thrust loads are borne by only half of the rollers at any one time, and then only indirectly at the 45 degree angle.

Yet another system is described in U.S. Pat. No. 3,361,494 by Galle. This patent is directed to a journal shaft having a shape like an arrowhead of revolution, with a truncated point and relatively small barbs. This arrowhead-like shape is reproduced in the rotary rock cutter bore. A large secondary cylindrical cut is taken on the upper unloaded side of the journal shaft tpering from mere contact at the proximal end of the shaft to a depth of about two "barbed heights" at the barb location, and having substantially the same radius as the basic journal shaft. This permits assembly of the cutter over the remaining lower barb by tipping the vertex of the conical cutter downward during the start of assembly, then upward to alignment with the journal shaft when it is fully in place thereon. A retention pin having an end resembling the missing barb is then positioned through a small angled bore formed through the journal shaft to retain the cutter in place by partially replacing the missing barb.

In this arrangement, Thrust loads are supported by a narrow area of contact with the barb on the lower loaded side of the journal shaft, a point contact with the retaining pin at the upper side of the journal shaft, and virtually no contact at all on the sides of the journal shaft. It is clearly a disadvantage of this system that something over fifty (50) percent of the journal shaft is machined in relief and thus can not bear any load at all.

Welton, in U.S. Pat. No. 3,746,405, describes a retention system based on a stout split snap ring. Proportioned as pictured, the radial bearing is enlarged in diameter, but not in length. As a result, the thrust load bearing capacity is relatively low and the ultimate retention strength is relatively high. Because of this limitation, this design is thought not to have been used commercially Vezirian discloses a system in U.S. Pat. No. 4,145,094 based upon a thick bushing which provides both radial and thrust bearing surfaces, grease reservoir, and a retention device. This bushing is split longitudinally into three sections, one of which is reduced in outside radius. The inside radii of all three sections closely fit the uniform diameter of the journal pin. The thin section provides a grease reservoir and facilitates the assembly of the three sections into an annular recess in the rotary rock cutter bore where they provide twin thrust bearing surfaces, and the radial bearing surface is provided by the two thicker sections. At assembly, the straight journal pin is passed through closely fitting bores in the split bushing and in the supporting leg. With the thin section of the bushing positioned on the unloaded upper side of the journal shaft, an electron welding beam is passed circumferentially around the journal pin thus welding the pin to the three sections of the split bushing and to the supporting leg.

The journal pin is substantially less in diameter than is the journal bearing, thus providing a weak cantilever support for the cutter assembly. Even with the fast efficient electron beam welding, the surrounding grease seal may be thermally damaged by the process.

U.S. Pat. No. 4,176,724 by Vezirian teaches the assembly of the necessary structures by means of an electron welding beam passing through a small hole in either the journal shaft or the rotary rock cutter. A segmented retaining ring having a rectangular cross section is welded to the member not bearing the access hole by rotating the cutter relative to the journal shaft while the welding is being accomplished. Finally the access hole is closed by a threaded plug or by welding.

In a later patent issued to the same inventor a further refinement in the electron beam assembly process is disclosed. In this system a headed journal bearing bushing is captured in the rotary cutter bore by welding in a mating bearing bushing providing radial and thrust bearing surfaces therebetween. Then a straight bearing pin passing through both the supporting leg and the inner bushing is welded to both members by the electron beam. This design shares the weakness of the cantilever mentioned in the previous patent.

Another rock cutter retention system containing a wire split snap ring of very light circular cross-section is used in U.S. Pat. No. 4,344,658 by Ledgerwood. This wire ring is loaded into a journal shaft groove having a distal side flaring conically outward. At assembly the wire ring expands into a semi-circular groove in the rotary rock cutter to a depth just over one half of the wire diameter. In-thrust loads reacting against the conical outer wall of the groove in the shaft serve to seat the wire ring ever more tightly in the groove in the rotary cutter. Both thrust capacity and retention strength in this system are very low. Furthermore, just as in the ball retention system of Cunningham, the design is disadvantaged by the impression of these loads upon sharp edges of the retaining grooves which leads to the rapid formation of undesirable detritus within the lubricated bearing system and results in a weak axial location of the rotary cutter and contributes to early cone wobble.

Various other patents exist for retention systems which are of lesser interest due to such various problems as the uneconomical use of cutter internal space, low thrust capacity, poor retention support, or excess complexity for use in the difficult drilling environment. Examples of such prior art are represented by: U.S. Pat. No. 4,181,377 by Oelke, U.S. Pat. No. 2,697,014 by Boice, U.S. Pat. No. 3,193,028, by Radzimovsky, U.S. Pat. No. 4,136,748 by Dickerhoff, U.S.Pat. No. 4,157,122 by Morris, and U.S. Pat. No. 4,444,518 by Schramm, et al.

SUMMARY OF THE INVENTION

In this invention, a system is deviced to axially locate and to retain a rotary member upon a shaft. The rotating member has a bearing bore formed within it about its axis of rotation. A first substantially rectangular groove is formed annularly within the bearing bore of the rotating member. A second such groove is formed in the bearing surface of a cooperatively supportive journal shaft, this second groove being of form, size, and location to symmetrically complement the first annular groove. A small straight loading bore is formed longitudinally in the journal shaft from an accessible end to intersect the minor diameter of the second annular groove. A number of individual thrust bearing keying elements having a pair of relatively flat, parallel plane bearing surfaces are used, which are sized to slide freely within the pair of mated annular grooves, substantially fitting the grooves and keying them together axially. These keying elements are loaded into the mated grooves through the loading bore in the journal shaft and through the intersection of loading bore and second annular groove. A retainer, to prevent the bearing elements from reentering the loading bore, is assembled into the loading bore to present a surface tangent to the inside diameter of the second annular groove. Finally the loading bore is closed and sealed to prevent the ingress of foreign matter into the bearing space, and/or the loss of lubricant from the bearing space.

This device provides for a substantial increase in thrust bearing capacity and a conservation of space which may then be used to increase radial bearing capacity relative to such capacities realized in the prior art.

It should be clearly noted that the thickness of the bearing elements is such as to provide for the free movement of the elements within the mated grooves without permitting excessive play.

The annular grooves each has radially extending surfaces residing in planes normal to the axis of the cooperating journal bearing. These radially extending surfaces, in cooperation with the flat parallel surfaces of the pre finished thrust bearing elements, serve to bear those loads which act to axially dislocate the rotating member upon the journal shaft.

In a rotary rock bit the journal shaft is generally cantilevered. In this case, the instant retention system serve primarily to resist loads tending to move the rotating member towards the unsupported end of the journal shaft. Loads acting in the opposite direction are borne primarily by mating thrust surfaces formed at the distal end of the primary radial bearing, and, after those surfaces suffer dimensionally from wear, by the backup thrust capacity provided by the instant retention system.

The flat polished bearing elements run in full surface contact with the aforementioned radially extending surfaces of the mated grooves, but may have various peripheral shapes, for example, round discs, or radial segments of a ring.

Presently the preferred for is that of the disc, which has the added capability of pumping lubricant along with it as it rolls about the axis of the journal, and due to the fact that it operates with less friction.

The ultimate retention strength of either form of bearing element is equal to the shear strength of the full complement of elements taken at the circumference of the journal bearing. Thrust loads are distributed over the sum of the projected flat surface areas of all the elements.

Although disc shaped bearing elements have appeared in the prior art as retention and thrust members, the designs proposed for their use devoted to large a volume of space for their incorporation, and introduced serious structural weaknesses due to the maner of assembly.

In the present invention the bearing elements are introduced in substantially the same way that the ball elements of common practice are introduced.

The radial bearing surfaces are formed as single uninterrupted surfaces of maximum length. The annular grooves are formed later, intermediate the length of the radial bearing. Thus the radial bearing has an effective axial stability of an uninterrupted bearing in which no length was sacrificed to the requirements of the retention system.

Another advantage accuring from the practice of this invention is a substantial reduction in the rate of loss of that axial stability, during operational use, as compared to the rate of loss experienced in the use of Cunninghams ball retention system. The spalling failure of the ball races under the point contacts on the sharp edges of the races serves to shorten the effective length of the radial bearing, and the detritus which is produced serves to enlarge the radial bearing clearance prematurely. The radial bearing is overly shortened initially due to the excessive amount of space occupied by the balls, and a short radial bearing offers little resistance to cutter wobble. A cutter that wobbles jeopardizes the grease seal in thus invites early failure of the rock bit.

An object of this invention is to produce a strong free running bearing capable of distributing loads over comparatively large areas while increasing the potential length and breadth of the radial bearing for axial stability.

Another object of this invention is to provide a sound and accurately predetermined axial location of the rotary rock cutter upon the journal shaft. Such a positioning of the cutter is important to maintain control of the diameter of the hole bored by the rock bit.

Yet another object of this invention is to increase the space available within the rotary rock cutter to provide the potential for greater radial bearing capacity.

An additional advantage found in the practice of this invention and resulting directly from the increase in axial rigidity is an increase in the capacity to drill a full diameter hole. When a cutter is capable of wobble, it is then incapable of drilling a full diameter hole.

The above noted objects and advantages of the present invention will be more fully understood and appreciated upon a study of the following description in conjunction with the detailed drawings.

BRIEF DESCRIPTION OF THE DRAWINGS

FIG. 3 is a view of a rock bit leg segment and journal shaft for a rotary rock cutter similar to that shown in FIG. 1 wherein ring segments are used as keying elements.

FIG. 4 is a sectional view taken along Plane B-B of FIG. 3 illustrating the alternate embodiment.

FIGS. 5-8 illustrate alternate configurations of retention and thrust bearing elements, wherein FIG. 5 is a disc element having a centrally located lubricant port in communication with both flat surfaces;

FIG. 6 is like FIG. 5, having lubrication distribution grooves formed in at least one of the flat surfaces;

FIG. 7 is a segmented-ring element with a lube port; and

FIG. 8 is like FIG. 7, with added lubricant distribution grooves formed in at least one of the flat surfaces. One groove wipes grease radially outward, while the other groove moves grease radially inward.

DESCRIPTION OF THE PREFERRED EMBODIMENTS AND BEST MODE FOR CARRYING OUT THE INVENTION

Figure 1:
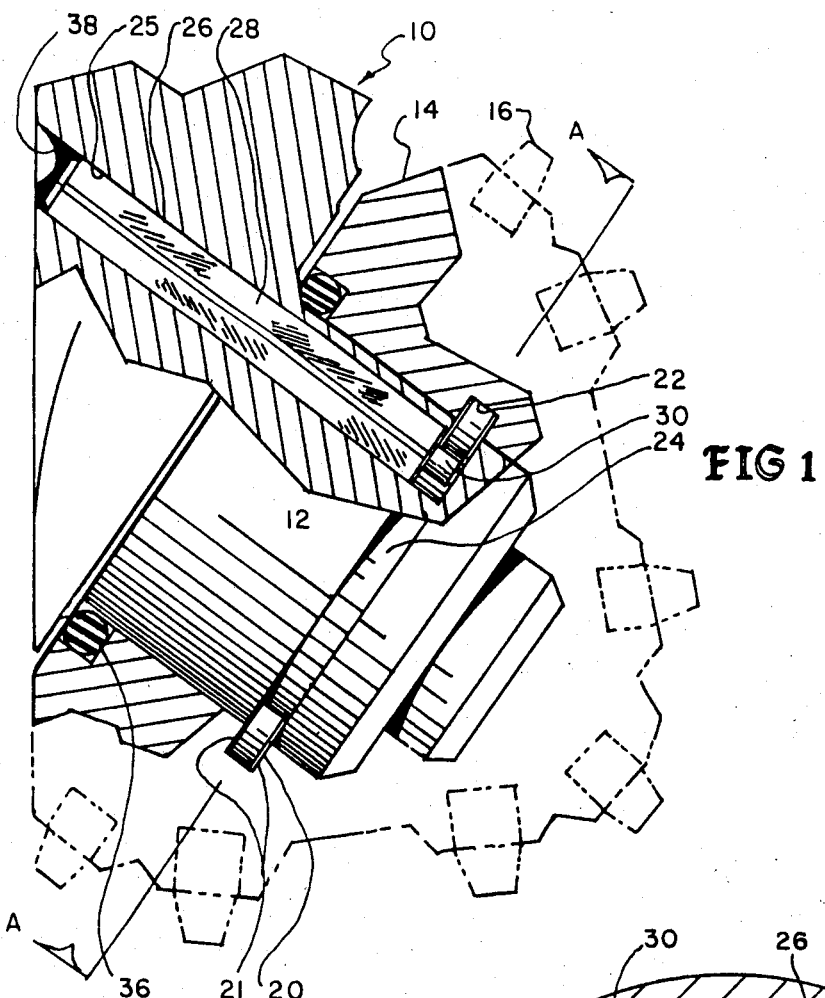
FIG. 1 is a view of a rock bit leg segment and journal shaft for a rotary rock cutter shown partially in section with the preferred embodiment of the present invention depicted as herein described.

Referring now to FIG. 1, a typical rock bit features a plurality of downwardly extending legs generally designated as 10 which each support a cantilevered load bearing journal shaft 12 projecting downwardly and inwardly, rotatably supporting a rotary rock cutter 14 equipped with inserted hard metal teeth 16. A series of thrust bearing and retaining elements 20 having two flat parallel surfaces 21 are held trapped but freely slideable within a groove 22 formed within cutter 14 and a complementary groove 24 formed within journal shaft 12. Bearing elements 20 are introduced to their positions within grooves 22 and 24 via loading bore 25 and retained in position by means of retainer pin 26. Loading bore 25 is formed in the journal shaft from its supported and accessible end, to intersect the inside diameter of groove 24. Pin 26 has an elongate body 28 which is supported in bore 25 and is shown with a square cross-section to permit the introduction of grease to the assembled bearing. Pin 26 has an end 30 the surface of which is tangent to the inside diameter of groove 24 at one point serving to block the return of any bearing elements to the loading bore 25. Pin end 30 may be alternately formed bearing an arc for fully closing the bore to groove intersection, if pin 26 is secured against rotation in loading bore 25. Loading bore 25 is shown closed and sealed by means of welding 38. A resilient seal 36 serves to close the other end of the bearing space against the ingress of foreign matter or the egress of lubricant.

Figure 2:
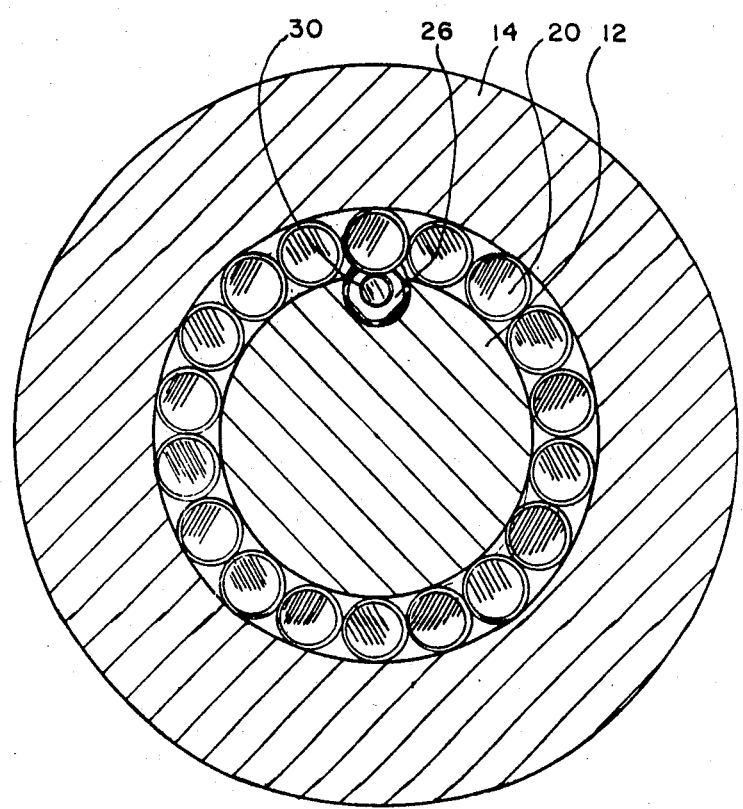
FIG. 2 is a sectional view taken along Plane A-A of FIG. 1 showing the retention and thrust bearing system using a full complement of disc shaped elements.

FIG. 2 illustrates more clearly the relative position of bearing elements 20 and the relative position of the loading bore intersection with the groove 24.

FIGS. 3 and 4 depict an alternative embodiment. Leg segment 50 supports journal 52 which bears the rotary rock cutter 54.

The features of this embodiment which differ from the embodiment of FIGS. 1 and 2 are, first, the configuration of the bearing elements 60 which are, in this case, radial segments of a flat ring which would substantially fill the mated grooves. Three consecutive segments 61, 62, and 63 are separated along lines which parallel a radius of the ring so that segments 61, and 63 have one radial edge and one parallel edge, and segment 62 has two parallel edges. Segment 62 is loaded last, between the segments 61 and 63 to permit loading of the last element while completely filling the grooves.

Secondly, the means of closing and sealing loading bore 65 is shown to be a threaded member 68, in place of the weld 38 of FIG. 1.

Although the disc type bearing element serves to pump lubricant about as it rolls around the annular retention grooves, the full complement of discs tend to block lubricant movement axially across the annular grooves. Thus, in FIGS. 5-8, a series of alternate bearing elements are shown which are configured to aid in lubricant distribution. FIG. 5 shows a disc element with a lubrication port 70 formed therethrough in line with the radial bearing surface. The element in FIG. 6 shows the addition of one possible pattern of distribution grooves 80 added. Grooves 80 are in communication with the through port, but are positioned in such a way that they can never coincide with the journal bearing surface to thus lessen the shear strength of the bearing element at that position.

FIG. 7 shows the ring segment type of element with a lubrication port 90 formed therethrough, and FIG. 8 adds distribution grooves 100 to the flat face of the element, in communication with lube port 102. One of the distribution grooves 100 is angled to transport lubricant radially outward, and the second groove is angled to transport lubricant radially inward as the rock cutter rotates. Obviously the grooves of FIG. 6 and FIG. 8 may be duplicated on the unpictured side of the element.

It should be obvious that various combinations of the features pictorially described or of features or modifications not so described could be used in the practice of this invention. A vital feature of this invention, however, remains in the fact that its goals are met and accomplished through simplification and not by complication. This system requires components no more numerous, components more amenable to manufacture, measure, and control, than the components of the prior practice.

Although it would be obvious to use other than a flat bottom for the two annular grooves, for example a full radius, such a variation in form is now considered to represent less than ideal utilization of critical space. The radiused portion of this example would not contribute significantly to thrust bearing capacity, but would preempt structural space from use by both the rock cutter and the journal thereby detracting from the strength of each.

Inspection of the drawings should make it clear that strength of retention is defined by the shear strength of the combined retainer bearing elements taken at the circumference of the radial bearing, and thrust loads are distributed over an area equal to the combined projected area of the complement of retainer bearing elements.

Axial location of the rotating cutter upon its journal is no more difficult than the location of right radial surfaces of the retainer grooves; much simpler than the establishment of dimensions from radial centers located in space as is required in prior practice.

The radial bearing surfaces in both the rotating member and the journal shaft are produced as single surfaces, the interrupting grooves being formed later. Thus, since they will display the end to end uniformity of dimension and concentricity of singularly established surfaces, they will also display an effective axial stability equivalent to an uninterrupted radial bearing of the same length. This relatively high level of axial stability also serves to protect the grease seal from the devastating effects of cutter wobble thereby extending its vital service life expectancy. Resistance to cutter wobble also enhances the chances of boring a full diameter hole.

This flat element retention system provides an increase in thrust load bearing capacity of sufficient magnitude to warrant the use of grooves relatively shallower than the appropriate ball races required in the prior practice. Typically the flat element retention system will occupy about twenty five (25%) percent less radial space than the ball system requires. At the same time about sixty (60%) percent less axial space is required by the flat element system. The radial space saved by the flat element system may be used to increase the minimum section of the rock cutter body, to increase the diameter of the primary radial bearing, or to increase a combination of the two in any desired proportion. The increased axial space available is usable directly as both radial bearing capacity and total effective radial bearing length relative to axial stability.

The space utilization consideration is of major importance in rock bit design because that space is at such a premium that to increase the space devoted to any single feature will deprive some other feature or features of that same space. In the practice of the instant invention however, the substantial improvement of the retention system actually yields available space which can then be utilized for other important features. The flat element retention and thrust bearing system makes unprecedentedly efficient use of the limited volume of space with the rotary rock cutter.

It will of course be realized that various modifications can be made in the design and operation of the invention without departing from the spirit thereof. Thus, while the principal preferred construction and mode of operation of the invention have been explained in what is now considered to represent its best embodiments, which have been illustrated and described, it should be understood that within the scope of the appended claims, the invention may be practiced otherwise than as specifically illustrated and described.

I claim:

1. An axial retention and thrust bearing system for locating and retaining a rotating member upon a shaft comprising:
   (a) a rotating member having a bearing bore formed therein about the axis of rotation, said rotating member having a first annular groove formed within said bearing bore, said first annular groove having parallel radially extending walls disposed substantially within planes normal to said axis of rotation,
   (b) a load bearing journal shaft operably mated with said bearing bore to rotatably support said rotating member, said journal shaft having a second annular groove formed within a load bearing surface, said second annular groove being disposed in opposing substantially symmetrical complementary relationship with said first annular groove, said journal shaft further forming therewith a longitudinally disposed loading bore entering from an end of said journal shaft to intersect at least the inside diameter of said second annular groove.
   (c) A multiplicity of retention and thrust bearing elements having two opposing substantially flat and parallel surfaces slideingly disposed within said radially extending walls of said first annular groove and said second annular groove,
   (d) means to retain said retention and thrust bearing elements within said first annular groove and said second annular groove, said means to retain being disposed in said loading bore tangent to said inside diameter of said second annular groove, and
   (e) means to close said loading bore.

2. The invention as described in claim 1 wherein said multiplicity of retention and thrust bearing elements are flat discs having a diameter slightly less than the combined depths of said first annular groove and said second annular groove, and a thickness slightly less than the width of said first annular groove and said second annular groove.

3. The invention as described in claim 1 wherein said retention and thrust bearing elements are formed as of radially divided segments of a flat ring.

4. The invention as described in claim 3 wherein said segments include three consecutive segments being divided from each other along lines running parallel to a radius of said flat ring, the middle segment of said three segments being loaded last to complete the formation within said annular grooves of a full ring shaped complement.

5. The invention as described in claim 1 wherein said retaining means disposed in said loading bore is formed to allow the passage of lubricant therethrough.

6. The invention as described in claim 1 wherein said retaining means is a retainer pin supported within and at least partially filling said loading bore, said pin presenting a surface tangent to said inside diameter of said second annular groove.

7. The invention as described in claim 6 wherein said retainer pin is secured to prevent its rotation within said loading bore.

8. The invention as claimed in claim 1 wherein said loading bore intersects said second annular groove over a length of arc of said inside diameter of said second annular groove sufficient to permit passage therethrough of said retention and thrust bearing elements.

9. The invention as described in claim 1 wherein said means to close said loading bore is by welding.

10. The invention as described in claim 1 wherein said means to close said loading bore is a threadably secured plug member.

11. The invention as described in claim 1 wherein a lubrication port is formed within at least one of said retention and thrust bearing elements, said port being in communication with said two flat parallel surfaces of said bearing elements.

12. The invention as described in claim 1 wherein at least one lubricant distribution groove is formed in at least one of said flat parllel surfaces of said retention and thrust bearing elements.

13. A device to axially locate and retain a rotary rock cutter upon a journal shaft in a rotary rock bit comprising:
   (a) A rotary rock cutter having a bearing bore formed therein about the axis of rotation,
   (b) a first annular groove formed within said bearing bore, said annular groove having substantially radially extending walls substantially disposed within planes normal to said axis of rotation,
   (c) a load bearing journal shaft cooperatively mating with said bearing core to rotatably support said rotary rock cutter,
   (d) a second annular groove formed within a bearing surface of said journal shaft, said second annular groove being disposed in opposing substantially symmetrical complementary relationship to said first annular groove,
   (e) a loading bore formed within said journal shaft, said loading bore being longitudinally disposed, entering said journal shaft at the supported end, and intersecting at least the inside diameter of said second annular groove,
   (f) a multiplicity of retaining and thrust bearing elements having two substantially flat parallel surfaces slideably disposed between said radially extending walls of said first and said second annular grooves
   (g) Means to retain said retaining and thrust bearing elements within said annular grooves, and
   (h) means to close said loading bore.

14. The invention as described in claim 13 wherein said multiplicity of retention and thrust bearing elements are flat discs having a diameter slightly less than the combined depths of said first annular groove and said second annular groove, and a thickness slightly less than the width of said first annular groove and said second annular groove.

15. The invention as described in claim 13 wherein said retention and thrust bearing elements are formed as of radially divided segments of a flat ring.

16. The invention as described in claim 15 wherein said segments include three consecutive segments being divided from each other along lines running parallel to a radius of said flat to complete the formation within said annular grooves of a full ring shaped complement.

17. The invention as described in claim 13 wherein said retaining means disposed in said loading bore is formed to allow the passage of lubricant therethrough.

18. The invention as described in claim 13 wherein said retaining means is a retainer pin supported within and at least partially filling said loading bore, said pin presenting a surface tangent to said inside diameter of said second annular groove.

19. The invention as described in claim 18 wherein said retainer pin is secured to prevent its rotation within said loading bore.

20. The invention as described in claim 13 wherein said loading bore intersects said second annular groove over a length of arc of said inside diameter of said second annular groove to permit passage therethrough of said retention and thrust bearing elements.

21. The invention as described in claim 13 wherein said means to close said loading bore is by welding.

22. The invention as described in claim 13 wherein said means to close said loading bore is a threadably secured plug member.

23. The invention as described in claim 13 wherein a lubrication port is formed within at least one of said retention and thrust bearing elements, said port being in communication with said two flat parallel surfaces of said bearing elements.

24. The invention as described in claim 13 wherein at least one lubricant distribution groove is formed in at least one of said flat parallel surfaces of said retention and thrust bearing elements.

* * * * *